(12) United States Patent
Parks, II et al.

(10) Patent No.: US 10,668,448 B1
(45) Date of Patent: Jun. 2, 2020

(54) CATALYST FOR LOW TEMPERATURE EMISSION CONTROL AND METHODS FOR USING SAME

(71) Applicants: UT-Battelle, LLC, Oak Ridge, TN (US); University of Tennessee Research Foundation, Knoxville, TN (US)

(72) Inventors: James E. Parks, II, Knoxville, TN (US); Sheng Dai, Knoxville, TN (US); Todd J. Toops, Knoxville, TN (US); Andrew J. Binder, Knoxville, TN (US)

(73) Assignee: UT-Battelle, LLC, Oak Ridge, TN (US)

(*) Notice: Subject to any disclaimer, the term of this patent is extended or adjusted under 35 U.S.C. 154(b) by 0 days.

(21) Appl. No.: 16/221,756

(22) Filed: Dec. 17, 2018

Related U.S. Application Data

(63) Continuation of application No. 15/933,446, filed on Mar. 23, 2018, now abandoned, which is a
(Continued)

(51) Int. Cl.
| | |
|---|---|
| *B01J 23/00* | (2006.01) |
| *B01J 23/10* | (2006.01) |
| *B01J 23/36* | (2006.01) |
| *B01J 23/40* | (2006.01) |
| *B01J 23/42* | (2006.01) |
| *B01J 23/44* | (2006.01) |
| *B01J 23/46* | (2006.01) |

(Continued)

(52) U.S. Cl.
CPC .......... *B01J 23/002* (2013.01); *B01J 23/894* (2013.01); *B01J 35/0006* (2013.01); *F01N 3/103* (2013.01); *B01J 2523/17* (2013.01); *B01J 2523/3712* (2013.01); *B01J 2523/845* (2013.01)

(58) Field of Classification Search
CPC ........ B01L 23/002; B01L 23/10; B01L 23/36; B01L 23/40; B01L 23/42; B01L 23/44; B01L 23/46; B01L 23/63; B01L 23/72; B01L 23/75; B01L 23/83; B01L 23/8896; B01L 23/8913; B01L 23/8926; B01L 23/894; B01L 23/8986; B01J 35/0006
See application file for complete search history.

(56) References Cited

U.S. PATENT DOCUMENTS

| | | | |
|---|---|---|---|
| 5,500,198 A * | 3/1996 | Liu | B01D 53/864 423/245.3 |
| 5,502,019 A * | 3/1996 | Augustine | B01D 53/8668 502/314 |

(Continued)

OTHER PUBLICATIONS

Liu, et al., "Influence of Calcination Temperature on the Structure and Catalytic Performance of CuOx-CoOy-CeO2 Ternary Mixed Oxide for CO Oxidation," Applied Catalysis A: General, 2013, pp. 282-288, vol. 451.

*Primary Examiner* — Cam N. Nguyen
(74) *Attorney, Agent, or Firm* — Edna I. Gergel

(57) ABSTRACT

The invention provides a composite catalyst containing a first component and a second component. The first component contains a ternary mixed metal oxide. The second component contains a platinum group metal. The composite catalyst is useful for catalyzing the low temperature oxidation of carbon monoxide and hydrocarbons.

6 Claims, 8 Drawing Sheets

CO

Related U.S. Application Data continuation of application No. 15/134,449, filed on Apr. 21, 2016, now abandoned.

(60) Provisional application No. 62/151,488, filed on Apr. 23, 2015.

(51) Int. Cl.
| | | |
|---|---|---|
| *B01J 23/63* | (2006.01) | |
| *B01J 23/72* | (2006.01) | |
| *B01J 23/75* | (2006.01) | |
| *B01J 23/83* | (2006.01) | |
| *B01J 23/889* | (2006.01) | |
| *B01J 23/89* | (2006.01) | |
| *B01J 35/00* | (2006.01) | |
| *F01N 3/10* | (2006.01) | |

(56) References Cited

U.S. PATENT DOCUMENTS

| | | | | |
|---|---|---|---|---|
| 7,166,263 B2* | 1/2007 | Vanderspurt | ........... | B01J 23/002 |
| | | | | 423/263 |
| 7,202,194 B2* | 4/2007 | Muhammed | ......... | B01D 53/945 |
| | | | | 502/304 |
| 7,329,627 B2* | 2/2008 | Wanninger | ........... | B01D 53/864 |
| | | | | 502/304 |
| 7,485,270 B2* | 2/2009 | Twigg | ................. | B01D 53/945 |
| | | | | 423/213.2 |
| 7,485,599 B2* | 2/2009 | Muhammed | ......... | B01D 53/945 |
| | | | | 502/302 |
| 7,612,011 B2* | 11/2009 | Vanderspurt | ........... | B01J 23/002 |
| | | | | 502/302 |
| 8,304,366 B2* | 11/2012 | Drews | ................. | B01D 53/944 |
| | | | | 502/327 |
| 8,435,917 B2* | 5/2013 | Estenfelder | .......... | B01J 19/2485 |
| | | | | 502/302 |
| 8,479,493 B2* | 7/2013 | Kim | ..................... | B01D 53/944 |
| | | | | 60/274 |
| 8,858,903 B2* | 10/2014 | Nazarpoor | ........... | B01D 53/944 |
| | | | | 423/213.2 |
| 9,114,385 B2* | 8/2015 | Brisley | .............. | B01D 53/9422 |
| 9,138,686 B2* | 9/2015 | Kim | ........................ | B01J 23/83 |
| 9,140,167 B2* | 9/2015 | Bergeal | .................... | B01J 23/96 |
| 9,216,408 B2* | 12/2015 | Nazarpoor | .................. | B01J 23/83 |
| 9,849,421 B2* | 12/2017 | Chandler | ............... | B01J 29/763 |
| 10,125,020 B2* | 11/2018 | Estenfelder | ................ | B32B 3/12 |
| 2006/0052243 A1* | 3/2006 | Muhammed | ......... | B01D 53/945 |
| | | | | 502/304 |
| 2011/0143921 A1 | 6/2011 | Hao et al. | | |
| 2012/0291420 A1 | 11/2012 | Kim et al. | | |
| 2015/0375221 A1* | 12/2015 | Bergeal | .................... | B01J 23/96 |
| | | | | 502/34 |

* cited by examiner $C_3H_8$

CATALYST FOR LOW TEMPERATURE EMISSION CONTROL AND METHODS FOR USING SAME

RELATED APPLICATIONS

This application is a continuation of U.S. patent application Ser. No. 15/933,446 filed on Mar. 23, 2018, now abandoned, which is a continuation of U.S. patent application Ser. No. 15/134,449 filed on Apr. 21, 2016 now abandoned, which asserts the priority of U.S. Provisional Application Ser. No. 62/151,488 filed on Apr. 23, 2015, the contents of U.S. patent application Ser. Nos. 15/933,446 and 15/134,449, and U.S. Provisional Application Ser. No. 62/151,488 are incorporated herein by reference.

STATEMENT REGARDING FEDERALLY SPONSORED RESEARCH

The United States Government has rights in this invention pursuant to contract no. DE-AC05-00OR22725 between the United States Department of Energy and UT-Battelle, LLC.

FIELD OF THE INVENTION

The present invention provides a catalyst for low temperature oxidation of carbon monoxide, hydrocarbons, and nitric oxide.

BACKGROUND OF THE INVENTION

Removing the harmful pollutants in engine exhaust has been an intense focus of the automotive, trucking, and off-road engine industries over the last several decades. Increasingly stringent emissions regulations worldwide have driven the introduction of engine improvements and catalysts and other aftertreatment for emissions control. In particular, the emissions regulations for fuel-efficient diesel engines that were implemented in 2007 and 2010 have resulted in a new generation of emissions control products. Among the products are catalysts that oxidize pollutants such as CO and hydrocarbons (HCs); these catalysts usually reach 90% conversion of pollutants between 200° C. and 350° C., but below these temperatures, the catalysts are relatively inactive.

Consequently, more than 50% of a vehicle's pollutant emissions occur in the first 2-3 minutes of the transient drive cycle required for certification and under "cold-start" or idling conditions. Thus, as emissions regulations become more stringent, meeting the emission regulations will require increased activity during this warm-up period.

To further complicate matters, the increased Corporate Average Fuel Economy standards that will be implemented over the next decade will result in the introduction of more fuel-efficient engines. Higher fuel efficiency will result in less heat lost to exhaust and lower exhaust temperatures, which further necessitates the need for increased emissions control activity at low temperatures. With this in mind the U.S. DRIVE Advanced Combustion & Emissions Control Technology Team has set a goal of achieving 90% conversion of CO/HC/NOx at 150° C. Such an aggressive goal is designed to address the challenges associated with meeting U.S. Environmental Protection Agency Tier 3 emission regulations for light-duty vehicles which phases in between 2017 and 2025 as well as other new emission regulations across the world.

Although great progress has been made through decades of research and development on the existing material combinations used for oxidation catalysts, further increase of low temperature performance is difficult. The platinum group metals (PGMs) Pt, Pd, and Rh are the active component in essentially all commercial oxidation catalysts. Increasing PGM loadings may help to increase the catalytic efficiency, but as PGM content is increased, maintaining a highly dispersed PGM surface becomes more difficult. This is due to the problem that as more PGM is added, larger PGM particles result which have less surface area to mass than the more finely dispersed smaller PGM particles associated with lower PGM loadings on catalysts. Since all catalytic reactions occur on the surface, the decreased surface area per added PGM causes the approach of increasing PGM content to be too expensive for long term success.

Furthermore, while PGM materials are active for both CO and HC oxidation reactions, both CO and HC readily chemisorb to the PGM surface which can create competition between the species for access to PGM sites where the oxidation process occurs. Such competition that decreases catalytic activity is known as "inhibition" and has been a major limiting factor in the low temperature activity of catalysts for engine emission control. Essentially, HCs in the exhaust stream can bind to the PGM surface and, at temperatures where no reactivity of HCs occurs, fully occupy the surface thereby preventing adsorption and reaction of CO. The same inhibition process can occur in reverse with CO masking PGM access to HCs. Thus, oxidation of CO and HCs is much more difficult when both pollutants are in the exhaust stream especially at low temperatures where oxidation reactions of either species does not occur rapidly.

It is important to note that a new family of advanced combustion variants for engines are being developed that attain higher fuel efficiency via increasing the homogeneity of combustion which lowers the internal combustion process temperatures in the engine cylinder. Such combustion techniques are known as "low temperature combustion" and have the benefits of higher fuel efficiency (as compared with conventional diesel combustion) and lower NOx and particulate matter emissions (due to the more homogenous combustion process and lower combustion temperatures). However, as expected, the exhaust observed from low temperature combustion engines has been shown to have lower temperature (as compared with conventional diesel engine exhaust) and increased CO and HC emissions (as more fuel components escape combustion due to the homogeneous charge and lower combustion temperatures). For these promising combustion techniques, the combination of lower exhaust temperatures and the potential for inhibition between CO and HC oxidation over PGM catalysts creates an even greater challenge.

In summary, the utility of existing PGM-based oxidation catalysts is insufficient for the combination of new emission requirements and changing exhaust conditions of new fuel-efficient engine technologies.

BRIEF SUMMARY OF THE INVENTION

The above needs have been met by the present invention, which provides, in one aspect, a composite catalyst comprising a first component comprising a ternary mixed metal oxide; and a second component comprising a platinum group metal. The composite catalysts are useful for low temperature oxidation of carbon monoxide and hydrocarbons. In one embodiment, the carbon monoxide and hydrocarbons are fully oxidized to non-harmful carbon dioxide and water. In another embodiment, the composite catalysts can also oxidize nitric oxide to nitrogen dioxide which is an important process step in the control of particulate matter and nitrogen oxide emissions by other filter and catalyst components further downstream in the exhaust system. The composite catalyst can be useful in numerous systems, such as in a component in an exhaust system in an engine, an emission control system, a motor vehicle, etc.

DETAILED DESCRIPTION OF THE INVENTION

Figure 1A:
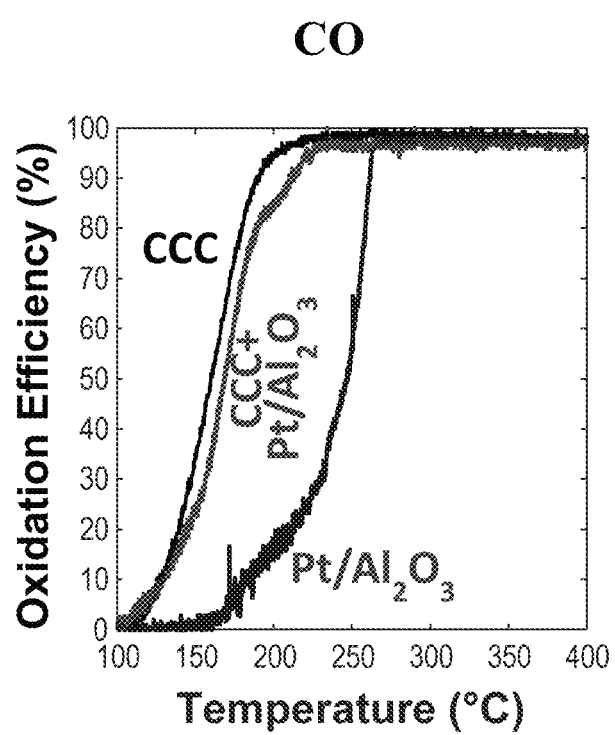
FIG. 1A Oxidation efficiency of CO constituents of the gas stream as a function of inlet gas temperature for the CCC, Pt/$Al_2O_3$, and CCC+Pt/$Al_2O_3$ catalysts.

In one aspect, the invention provides a composite catalyst capable of low temperature oxidation, such as oxidation of carbon monoxide (CO) and oxidation of hydrocarbons. A composite catalyst in accordance with the claimed invention contains a first and second component.

The first component comprises a ternary mixed metal oxide. A ternary mixed metal oxide is comprised of three different metal oxides. A metal oxide is typically composed of a metal and at least one oxygen atom. Any metal oxide can be used in the ternary mixed metal oxide of the invention. The metal component of the metal oxide can be, for example, cobalt, copper, cerium, iron, manganese, magnesium, aluminum, silver, gold, etc. In one embodiment, the ternary mixed metal oxide is copper oxide-cobalt oxide-cerium oxide. Cerium oxide is commonly known as ceria. The ternary mixed metal oxide copper oxide-cobalt oxide-cerium oxide is described in for example, Liu et al. (*Applied Catalysis A: General*, 451 (2013) 282-288); and Binder et al. (*Angew. Chem.*, 127 (2015) 13461-13465). The disclosures of Liu et al. and Binder et al. are hereby incorporated by reference.

Any atomic ratio can be used for the metal component of the metal oxide in the ternary mixed metal oxide. Suitable atomic ratios can be precisely, about, at least, up to, or less than 10, 9, 8, 7, 6, 5, 4, 3, 2 or 1, independently for each metal component, or an atomic ratio within a range bounded by any two of the foregoing values. For example, in one embodiment, the copper oxide-cobalt oxide-cerium oxide can have an atomic ratio of 1:5:5 for Cu:Co:Ce.

The ternary mixed metal oxide can be synthesized by any method known to those skilled in the art. See for example, the method disclosed in Lie et al. (*Applied Catalysis A: General*, 451 (2013) 282-288) for the synthesis of the ternary mixed metal oxide, copper oxide-cobalt oxide-cerium oxide The second component of the composite catalyst comprises platinum group metals (PGMs). Platinum group metals useful in the composite catalyst of the present invention include Platinum, Osmium, Iridium, Ruthenium, Rhodium, and Palladium. Such platinum group metals fall in groups 8, 9, and 10 and period 5 and 6 of the periodic table. The platinum group metal can be any of these metals or any combination of platinum group metals.

In one embodiment, when the second component of the composite catalyst is an active PGM of significant cost, the active PGM is commonly supported on a high surface area metal oxide support. In this embodiment, the active PGM is dispersed across the metal oxide support to form a multitude of high surface area particles for the active metal to efficiently catalyze chemical reactions based on the pollutant species chemisorbing on the active metal surface. The metal oxide support may be alumina, ceria, zirconia, silica, or other metal oxides known to those skilled in the art. In effect, the support metal oxide serves to preserve a durable dispersion of active metal sites for the catalytic reactions to occur.

In one embodiment, the platinum group metals are nanosized. The term "nanosized" as used herein refers to particles having a diameter in the nanosize range. The nanosized particles generally have a size of no more than about 1000 nm. In different embodiments, the nanosized objects have a size of precisely, about, at least, up to, or less than 900 nm, 800 nm, 700 nm, 600 nm, 500 nm, 450 nm, 400 nm, 350 nm, 300 nm, 250 nm, 200 nm, 150 nm, 100 nm, 90 nm, 50 nm, 40 nm, 30 nm, 20 nm, 10 nm, 5 nm, 4 nm, 3 nm, 2 nm, or 1 nm, or a size within a range bounded by any two of the foregoing values. As used herein, the term "about" generally indicates within ±0.5, 1, 2, 5, or 10% of the indicated value (for example, "about 50 nm" can mean 50 nm±2%, which indicates 50±1 nm or 49-51 nm). For example, the nanosized particles useful in the present invention can have a diameter from 1-100 nm, 5-90 nm, 10-50 nm, etc.

The first component and the second component of the composite catalyst of the invention can be combined by any method known to those skilled in the art. For example, the composite catalyst can be a physical mixture of the first component and the second component. Physical mixtures can be made by any method known in the art. Having the first component in intimate contact with the second component is not necessary to achieve the improved performance; thus, there are large numbers of options available to combine the first and second components to achieve the desired improved performance provided the first and second components are as described.

For example, in another embodiment, the first component and the second component can be in series with respect to the process flow of the pollutant containing stream, with either the first component or the second component being first in the series. For example, the first component (ternary mixed metal oxide) can be placed upstream of the second component (PGM-based catalyst) so that the first component can oxidize CO at low temperatures so that the second component can be more effective at oxidizing HCs in the stream once CO is removed from the stream. Here removal of the CO species from the stream enables the PGM-based catalyst to oxidize HCs at lower temperatures since CO is not present to chemisorb onto the PGM surface and inhibit HC reactions on that surface.

In yet another embodiment, the active PGM portion of the second component is affixed directly on the surface of the first component (ternary mixed metal oxide) surface to form an intimate contact between the ternary mixed metal oxide and PGM materials. In this manner, the PGM metal is very closely positioned to the ternary mixed metal oxide sites on a nanometer and atomic scale such that adsorbed pollutant species can readily translate between the PGM and ternary mixed metal oxide active sites. Such increased mobility of pollutant or intermediate reaction product species between the catalytically active PGM and ternary mixed metal oxide sites can facilitate oxidation of the pollutant species at the lowest temperature or energy state available by both PGM and ternary mixed metal oxide sites.

The first and second components can be combined in the range of ternary mixed metal oxide making up between 1% and 99% of the composite catalyst and catalyst with platinum group metal between 99% and 1% of the composite catalyst. In different embodiments, the composite catalyst has a percentage of ternary mixed metal oxide precisely, about, at least, up to, or less than 90%, 80%, 70%, 60%, 50%, 40%, 30%, 20%, 10%, or a percentage of ternary mixed metal oxide particles within a range bounded by any two of the foregoing values. In other embodiments, the composite catalyst has a percentage of platinum group metal containing catalyst precisely, about, at least, up to, or less than 90%, 80%, 70%, 60%, 50%, 40%, 30%, 20%, 10%, or a percentage of platinum group metal containing catalyst within a range bounded by any two of the foregoing values. In one embodiment, the ternary mixed metal oxide will make up between 40% and 60% of the composite catalyst and the platinum group metal containing catalyst will make up between 60% and 40% of the composite catalyst. In the platinum group metal catalyst component embodiment where the platinum group metals are supported on a metal oxide different form the ternary mixed metal oxide component, the platinum group metal has a percentage of about, at least, up to, or less than 10%, 5%, 2%, 1%, 0.5%, 0.2%, 0.1%, 0.05%, 0.02%, 0.01%, 0.005%, 0.002%, 0.001% or a percentage of platinum group metal within a range bounded by any two of the foregoing values. In the composite catalyst embodiment where the platinum group metal is supported directly on the ternary mixed metal oxide component, the platinum group metal has a percentage of about, at least, up to, or less than 10%, 5%, 2%, 1%, 0.5%, 0.2%, 0.1%, 0.05%, 0.02%, 0.01%, 0.005%, 0.002%, 0.001% or a percentage of platinum group metal within a range bounded by any two of the foregoing values.

It is the combination of the first and second components of the composite catalyst that created unexpected results indicating a synergistic combination that results in the combination of the materials creating a composite catalyst with superior low temperature performance over either of the components individually. For example, the composite catalysts of the present invention are capable of catalyzing the oxidation of CO to $CO_2$ at low temperatures, such as at, or, around 150° C. In addition, surprisingly, the composite catalyst gave higher hydrocarbon oxidation efficiencies at lower temperatures than either the ternary mixed metal oxide catalyst or platinum group metal catalyst alone. Thus, useful composite catalysts with improved low temperature oxidation performance can be used in many applications, including automotive exhaust emission control.

The composite catalyst of the invention can be used in any system in which it is beneficial to oxidize carbon monoxide, hydrocarbons, nitric oxide or any combination of these species. In one embodiment, the composite catalyst is an exhaust system. Such exhaust systems can be in an engine. For example, the engine can be in a motor vehicle, an airplane, etc. Or, the engine may be stationary and operate for the purpose of producing electricity.

In another embodiment, the composite catalyst is in an emission control system. The composite catalyst can be used in industrial processes that generate CO, hydrocarbons, and other pollutants including power generation facilities and heating systems.

EXAMPLES

Example 1

A ternary mixed metal oxide catalyst composed of CuO, $Co_3O_4$, and $CeO_2$ was synthesized by precipitation. The molar ratios (Cu:Co:Ce) used in the catalyst was 1:5:5, and the catalyst will be referred to as "CCC". (CCC), 1:0:10 (CuCo), 1:10:0 (CuCe), and 0:5:5 (CoCe). During synthesis of the CCC catalyst, 0.2416 g (1 mmol) of copper nitrate trihydrate ($Cu(NO_3)_2.3H_2O$, Aldrich) and appropriate amounts of cobalt chloride hexahydrate ($CoCl_2.6H_2O$, Aldrich) and cerium nitrate hexahydrate ($Ce(NO_3)_2.6H_2O$, Aldrich) were simultaneously added to 100 mL deionized water and dissolved at room temperature. Next, 100 mL NaOH solution (0.375 M) was added to the solution dropwise under vigorous stirring. After approximately 30 min the precipitate was filtered by vacuum filtration. The obtained product was washed with $H_2O$ followed by ethanol and allowed to dry at room temperature until it flaked easily from the filter paper, followed by further drying at 60° C. in a vacuum oven. Calcination at 600° C. (1° C./min rate) in air resulted in the as-synthesized catalyst.

A Pt-based catalyst was synthesized by co-precipitation of a Pt aqueous solution on a high surface area $\gamma$-$Al_2O_3$ (Aldrich). The Pt loading was 1% by weight. The catalyst was calcined at 600° C. (1° C./min rate) in air.

A physical mixture of the CCC and Pt/$Al_2O_3$ catalysts was prepared by combining equal mass of the CCC and Pt/$Al_2O_3$ catalysts. In this manner, the Pt loading of the physical mixture was half of the Pt in an equal mass of the Pt/$Al_2O_3$ catalyst.

The CCC, Pt/$Al_2O_3$, and physical mixture of both catalysts (CCC+Pt/$Al_2O_3$) were evaluated in a quartz powder reactor under simulated exhaust conditions. Temperature and flow were controlled by a furnace and mass flow controllers, respectively; the space velocity (ratio of gas flow to catalyst volume) of flow was controlled to 150,000/hr. Quartz wool was placed upstream and downstream of the catalyst powder to fix the catalyst position in gas flow stream. The simulated exhaust mixture consisted of 1% CO, 500 ppm $C_3H_6$, 500 ppm $C_3H_8$, 500 ppm NO, 10% $O_2$, and 5% $H_2O$ in a Ar balance. $CO_2$ is also common to exhaust streams but was not added to the experimental gas to enable monitoring of $CO_2$ as a product of the oxidation reactions for the purpose of verifying complete oxidation of the CO and hydrocarbon constituents. $H_2O$ was added via flow of the gases through liquid $H_2O$ such that $H_2O$ vapor entered the gas stream.

Figure 1B:
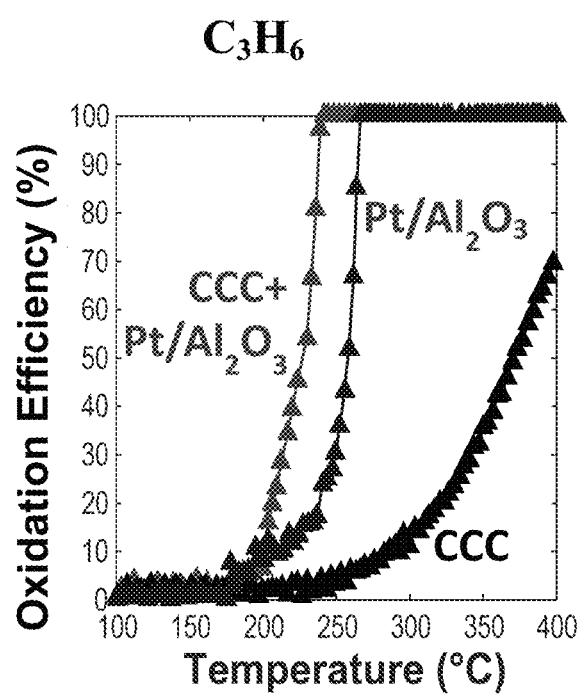
FIG. 1B Oxidation efficiency of $C_3H_6$ constituents of the gas stream as a function of inlet gas temperature for the CCC, Pt/$Al_2O_3$, and CCC+Pt/$Al_2O_3$ catalysts.
Figure 1C:
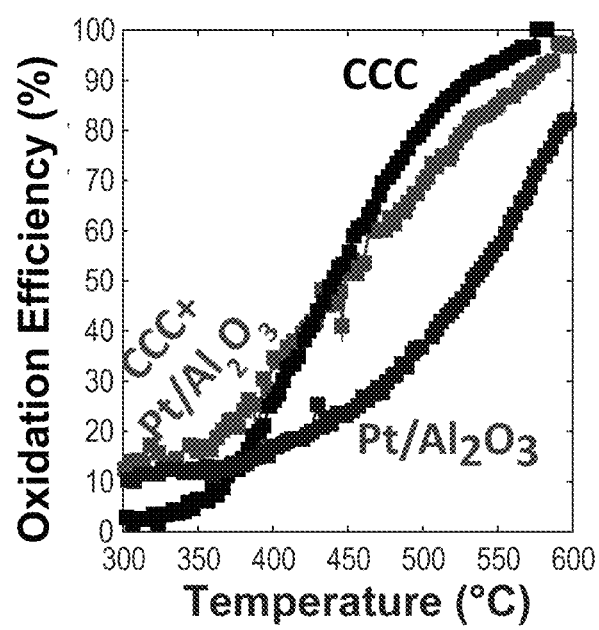
FIG. 1C Oxidation efficiency of $C_3H_8$ constituents of the gas stream as a function of inlet gas temperature for the CCC, Pt/$Al_2O_3$, and CCC+Pt/$Al_2O_3$ catalysts.

The oxidation efficiency of the CO, $C_3H_6$, and $C_3H_8$ constituents of the gas stream are shown in FIGS. 1A, 1B, and 1C, respectively, as a function of inlet gas temperature for the CCC, $Pt/Al_2O_3$, and $CCC+Pt/Al_2O_3$ catalysts. For all data, the conversion of the pollutant species was achieved via oxidation to $CO_2$ and $H_2O$ products. As observed in the CO data (FIG. 1A), the CCC catalyst showed the lowest temperature of oxidation of CO, and the $Pt/Al_2O_3$ catalyst required a temperature ~80° C. higher for similar oxidation efficiencies to occur. The $CCC+Pt/Al_2O_3$ composite catalyst achieved CO oxidation at almost the same temperature as the CCC catalyst alone (only 5-10° C. higher temperature). For the oxidation of $C_3H_6$ (FIG. 1B), surprisingly, the $CCC+Pt/Al_2O_3$ composite catalyst achieved oxidation of $C_3H_6$ at temperatures significantly lower than either the $Pt/Al_2O_3$ or CCC catalysts alone. The $CCC+Pt/Al_2O_3$ catalyst oxidizes $C_3H_6$ at ~40° C. lower temperatures than the $Pt/Al_2O_3$ catalyst and at ~150° C. lower temperatures than the CCC catalyst. Since the composite catalyst has only half of the Pt content as the $Pt/Al_2O_3$ catalyst and the CCC catalyst is only effective for $C_3H_6$ oxidation at much higher temperatures, this result clearly shows a synergistic advantage obtained by the combination of materials in the composite $CCC+Pt/Al_2O_3$ catalyst.

The oxidation of $C_3H_8$ (FIG. 1C) shows relatively high temperatures are required for the oxidation of $C_3H_8$ by all three catalysts. Thus, if neither component in the composite $CCC+Pt/Al_2O_3$ catalyst are active for $C_3H_8$ conversion, little improvement in oxidation is observed for the $CCC+Pt/Al_2O_3$ catalyst. It is important to note that $C_3H_8$ is known to be more difficult to oxidize catalytically than $C_3H_6$ due to the higher concentration of C—H bonds. Considering all three pollutant species of interest in the example (CO, $C_3H_6$, and $C_3H_8$), the composite $CCC+Pt/Al_2O_3$ catalyst gives the best overall low temperature oxidation performance for all three species and enables improved performance of the Pt-based catalyst at half the Pt content which demonstrates significant cost reduction.

Example 2

A ternary mixed metal oxide catalyst composed of CuO, $Co_3O_4$, and $CeO_2$ (CCC) was synthesized as described in Example 1 and compared with a Pd-based catalyst in reactor studies similar to the study described in Example 1. The Pd-based catalyst was created with a $SiO_2$ and $ZrO_2$ high surface area support. During catalyst synthesis, amorphous silica gel (Davisil Grade 635, Aldrich) was used as a support, and $ZrO_2$ was incorporated on the $SiO_2$ surface. $SiO_2$ was first dehydrated with anhydrous ethanol (200 proof, anhydrous, ≥99.5%, Aldrich) and reacted at 80° C. for 3 h with zirconium(IV) n-propoxide (70% w/w in n-propanol, Alfa Aesar) dissolved in ethanol. $ZrO_2$-incorporated $SiO_2$ were obtained by removing the non-reacted precursors through washing with ethanol followed by drying at 100° C. and calcining at 500° C. for 2 h. Palladium (II) nitrate solution (Pd 12~16 w/w, Alfa Aesar) was impregnated on $ZrO_2$—$SiO_2$ supports by incipient wetness method to 1 wt % Pd loading. After the impregnation, the catalysts were dried at 100° C. in air and reduced in a flow of 10% $H_2$ in Ar at 500° C. for 2 h. The catalyst was then calcined at 600° C. in air.

Figure 2:
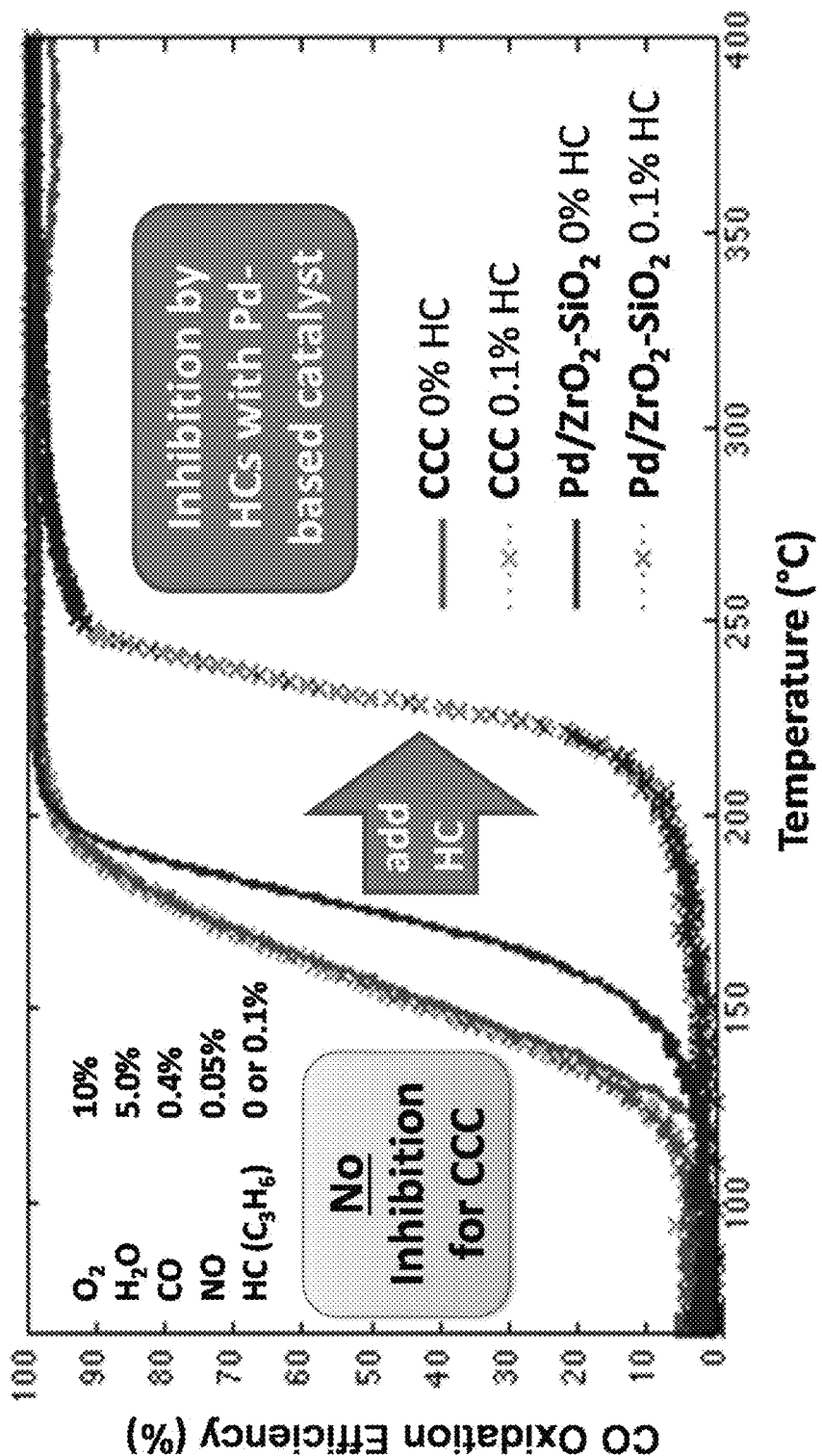
FIG. 2 CO oxidation efficiency in the presence or absence of $C_3H_6$ for the CCC and Pd/$ZrO_2$—$SiO_2$ catalysts.

The CCC component was compared with the $Pd/ZrO_2$—$SiO_2$ catalyst in a simulated exhaust stream containing 0.4% CO, 500 ppm NO, 10% $O_2$, and 5% $H_2O$ in an Ar balance. Experiments were conducted with 0% $C_3H_6$ and with 0.1% $C_3H_6$ added to the stream, and the oxidation efficiency of CO was monitored as a function of inlet gas temperature. The resulting data (FIG. 2) shows CO oxidation efficiency in the presence of $C_3H_6$ (dashed line and "x" icons) as well as the CO oxidation efficiency without $C_3H_6$ present (solid line) for both the CCC and $Pd/ZrO_2$—$SiO_2$ catalysts. For the Pd-based catalyst, the addition of $C_3H_6$ to the exhaust stream greatly impacts the CO oxidation negatively as higher inlet gas temperatures are required to oxidize CO in the presence of $C_3H_6$. Such data is typical of the inhibition of hydrocarbon (HC) species on the reactivity for CO oxidation by platinum group metal catalysts. While a Pd-based catalyst is shown here, the effect has been observed on Pt-based catalysts, catalysts with mixtures of Pt and Pd, and catalysts with other platinum group metals and mixtures thereof. In contrast, the CCC catalyst shows virtually no difference in the CO oxidation efficiency as a function of temperature with or without the presence of $C_3H_6$. The lack of inhibition of hydrocarbon species on the CO oxidation process on the CCC catalyst is a unique property that may explain the improved performance by the composite $CCC+Pt/Al_2O_3$ catalyst in Example 1 above.

Example 3

Figures 3A, 3B:
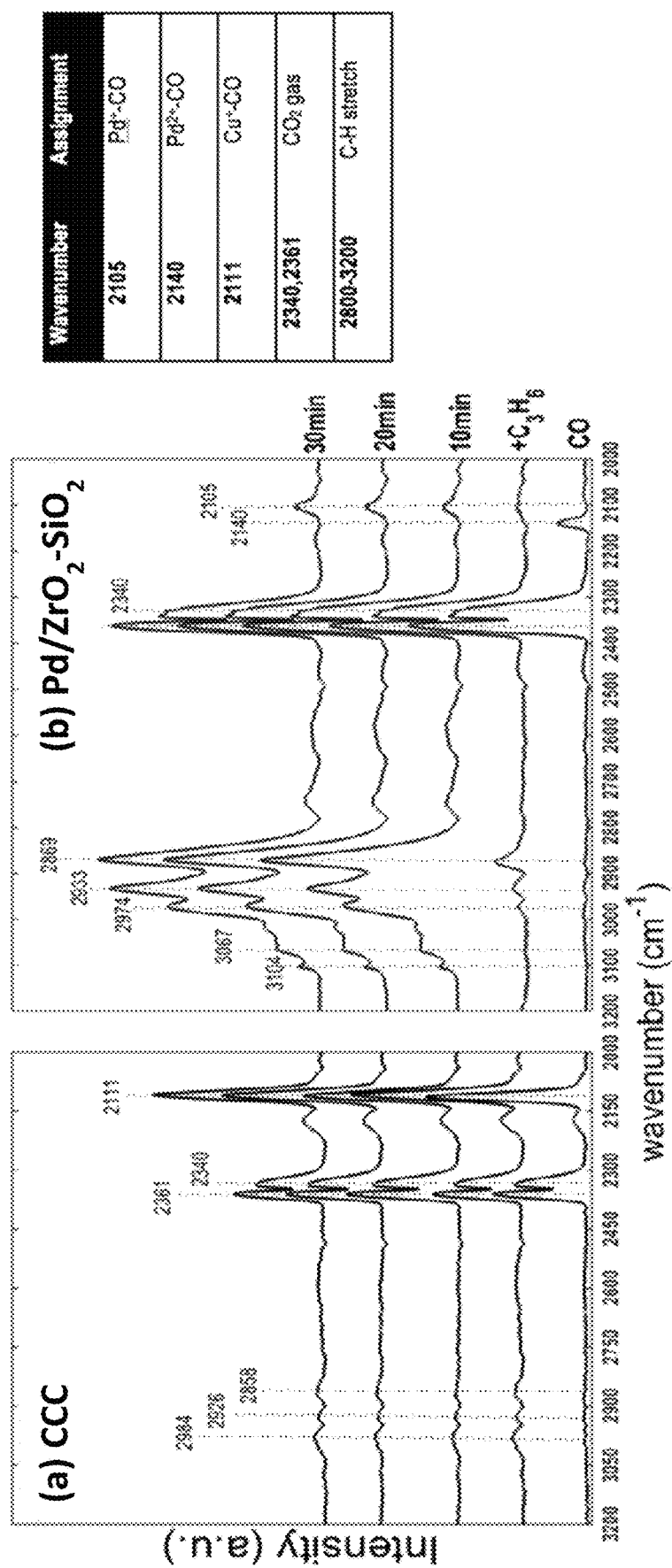
FIG. 3A DRIFTS spectra for CCC catalyst.
FIG. 3B DRIFTS spectra for Pd/$ZrO_2$—$SiO_2$ catalyst.

The adsorption of CO and hydrocarbon species onto the CCC and $Pd/ZrO_2$—$SiO_2$ catalysts described in Example 2 above was characterized with Diffuse Reflectance Infrared Fourier Transform Spectroscopy (DRIFTS) as shown in FIG. 3. Here the catalysts were first exposed to CO so that CO could saturate any adsorption sites on the catalyst surface. Then, $C_3H_6$ was introduced into the gas stream flowing over the catalysts, and DRIFTS spectra were monitored over time during $C_3H_6$ exposure. Details of the DRIFTS measurements performed using a Digilab FTS 7000 series FTIR spectrometer equipped with a Praying Mantis DRIFTS apparatus as follows: The catalyst bed was first cleaned by heating to 400° C. in $O_2$/Ar. DRIFTS spectra were taken at a temperature within a region of 5-10% CO oxidation as determined by reactor analysis. After the cleaning step, the bed was cooled to the analysis temperature, and a clean background was taken in 10% $O_2$/Ar. [CO]=0.4% was then introduced into the stream and a spectrum taken after 30 min of exposure. [$C_3H_6$]=0.1% was then added and a spectrum was taken immediately up introduction followed by additional spectra at 10, 20, and 30 min exposure times. Spectra were obtained at 2 cm$^{-1}$ resolution with 64 scans averaged.

The resulting DRIFTS spectra for the CCC (FIG. 3A) and $Pd/ZrO_2$—$SiO_2$ (FIG. 3B) catalysts show dramatic differences in the surface species occurring during $C_3H_6$ exposure. The CCC spectra show very little change in the 2800-3200 cm$^{-1}$ range which is commonly associated with hydrocarbon adsorption onto the surface; this indicates hydrocarbons do not readily adsorb onto the CCC catalyst surface. In contrast, the Pd catalyst shows strong adsorption bands in the 2800-3200 cm$^{-1}$ region that occur once the catalyst is exposed to $C_3H_6$. Thus, the Pd-based catalyst readily adsorbs the $C_3H_6$. In addition, comparison of the wavenumber range associated with CO-bonding (2105-2111 cm$^{-1}$) shows that the $Cu^+$—CO bond is essentially not affected by $C_3H_6$ exposure to the CCC catalyst, but the $Pd/ZrO_2$—$SiO_2$ catalyst shows a dramatic shift between $Pd^{2+}$—CO and $Pd^+$—CO bonds once $C_3H_6$ exposure occurs.

These data provide evidence to support the data shown in Examples 1 and 2. The CCC catalyst can oxidize CO without inhibition from the presence of hydrocarbons since hydrocarbons are not strongly adsorbed onto the CCC surface. In contrast, the Pd-based catalyst readily adsorbs hydrocarbons which cause inhibition of the CO oxidation process via competition for adsorption on the active Pd site, but once the platinum group metal catalyst is combined with the CCC catalyst, CO oxidation can occur on the CCC catalyst even in the presence of hydrocarbons. Subsequently, the resulting exhaust stream contains only the remaining hydrocarbon species that the CCC did not control but can be oxidized readily by the (CO-free) platinum group metal catalyst.

Example 4

Figures 4A, 4B, 4C, 4D:
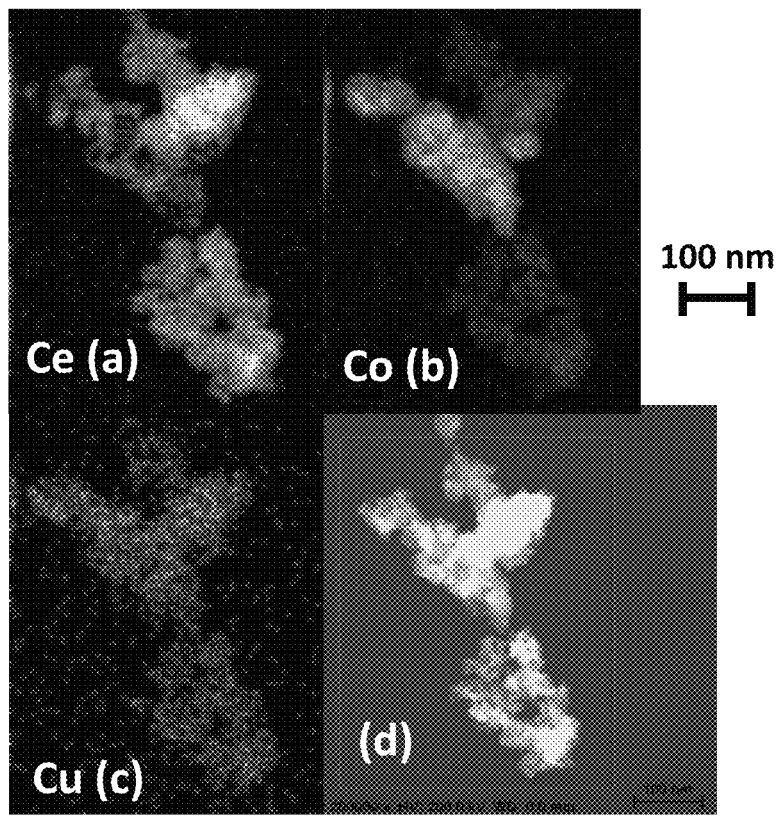
FIG. 4A STEM including EDX analysis of atomic composition for Ce.
FIG. 4B STEM including EDX analysis of atomic composition for Co.
FIG. 4C STEM including EDX analysis of atomic composition for Cu.
FIG. 4D STEM including EDX analysis of atomic composition for Ce-, Co-, and Cu-oxide phases.

The CCC catalyst was analyzed with scanning transmission electron microscopy (STEM) including energy dispersive x-ray (EDX) analysis of atomic composition. The resulting data images are shown in FIG. 4 where the black bar denotes a scale of 100 nm. The data show that the Ce-, Co-, and Cu-oxide phases are mixed well and form a composite mixed metal oxide particle agglomeration as shown in the raw STEM image (FIG. 4D). Also, based observation of the EDX data for Ce (FIG. 4A), Co (FIG. 4B), and Cu (FIG. 4C), the Cu appears to be the most uniform component and occurs in association with both Ce and Co phases.

Figures 5A, 5B:
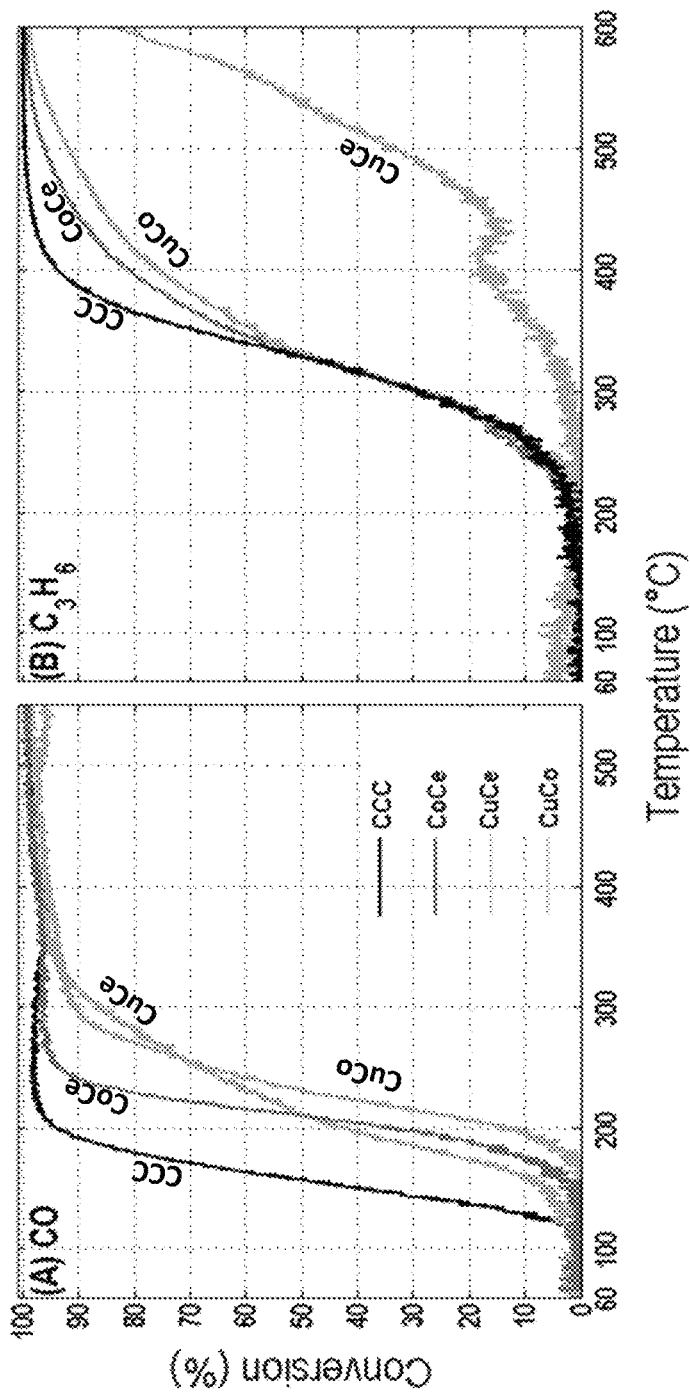
FIG. 5A Oxidation efficiency of CO over the binary mixtures as compared with the ternary mixed metal oxide CCC catalyst.
FIG. 5B Oxidation efficiency of $C_3H_6$ over the binary mixtures as compared with the ternary mixed metal oxide CCC catalyst.

Binary combinations of the Ce-, Co-, and Cu-oxides were also prepared and studied in a reactor under simulated exhaust conditions as described above. Results for the oxidation efficiency of CO and $C_3H_6$ over the binary mixtures as compared with the ternary mixed metal oxide CCC catalyst are shown in FIG. 5. The CO data (FIG. 5A) shows that the ternary mixed metal oxide catalyst enables oxidation of CO at much lower temperatures than any of the other binary combinations of metal oxides. The $C_3H_6$ data (FIG. 5B) shows that $C_3H_6$ oxidation is equivalent for any of the ternary or binary combinations that contain Co and Ce oxides, but the binary combination of Cu- and Ce-oxides requires a higher temperature for $C_3H_6$ oxidation. Overall, the ternary mixed metal oxide catalyst (CCC) gives the best combined oxidation performance for CO and $C_3H_6$.

Example 5

Figure 6:
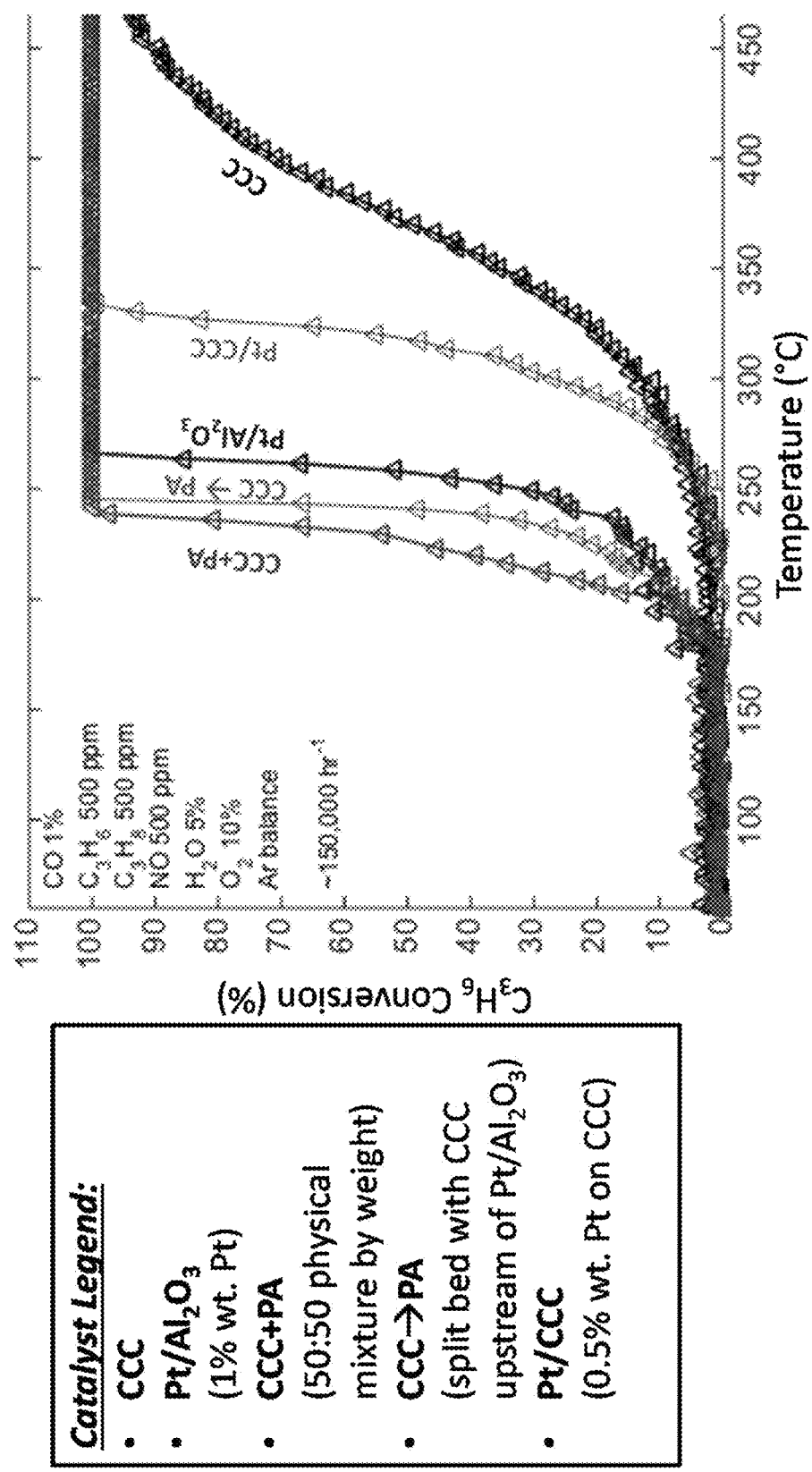
FIG. 6 $C_3H_6$ oxidation efficiency as a function of temperature for different methods of combing the ternary mixed metal oxide and platinum group metal catalyst components.

As described above, the composite catalyst containing both the ternary mixed metal oxide and platinum group metal based catalysts can be combined by various methods to achieve improved oxidation for CO and hydrocarbons at low temperatures. FIG. 6 shows $C_3H_6$ oxidation efficiency as a function of temperature for different methods of combining the ternary mixed metal oxide and platinum group metal catalyst components. Here the ternary mixed metal oxide component is represented by CCC, and the platinum group metal catalyst component is represented by the $Pt/Al_2O_3$ catalyst. Both the CCC and $Pt/Al_2O_3$ are as described in Example 1. Experiments were conducted in a reactor as described above in Example 1 with a simulated exhaust stream containing 1% CO, 500 ppm $C_3H_6$, 500 ppm $C_3H_8$, 500 ppm NO, 10% $O_2$, and 5% $H_2O$ in a Ar balance.

The $C_3H_6$ oxidation efficiency of the CCC and $Pt/Al_2O_3$ components alone are shown in FIG. 6 with the $Pt/Al_2O_3$ catalyst demonstrating lower temperature oxidation of $C_3H_6$. Performance of the three methods for combining the CCC and $Pt/Al_2O_3$ catalysts are as follows. A physical mixture of the CCC and $Pt/Al_2O_3$ catalysts at a 50:50 ratio by weight (CCC+PA) gives the lowest temperature for oxidation of $C_3H_6$. Combining the CCC and $Pt/Al_2O_3$ components in series with the CCC catalyst upstream of the $Pt/Al_2O_3$ catalyst (CCC→PA) gives the second best performance and lower temperature oxidation of $C_3H_6$ as compared with the $Pt/Al_2O_3$ catalyst. Finally, direct precipitation of Pt onto the CCC catalyst with a total Pt loading of 0.5% by weight (Pt/CCC) results in oxidation of $C_3H_6$ at temperatures between those exhibited by the Pt and CCC components individually. Considering that all of the composite catalyst combinations CCC+PA, CCC→PA, and Pt/CCC have nominally 50% of the Pt as the $Pt/Al_2O_3$ catalyst, the data demonstrate improved catalyst utility of the composite ternary mixed metal oxide and platinum group metal catalyst as compared to the $Pt/Al_2O_3$ and CCC catalysts individually.

What is claimed is:

1. A composite catalyst comprising:
   a. a first component comprising a ternary mixed metal oxide, wherein said ternary mixed metal oxide comprises copper oxide, cobalt oxide, and cerium oxide, wherein the atomic ratio for the metal component of the metal oxide in the ternary mixed metal oxide is each independently from about 1 to about 10; and
   b. a second component comprising a platinum group metal.

2. A composite catalyst according to claim 1, wherein the composite catalyst catalyzes the oxidation of CO to $CO_2$ at or around 150° C.

3. A composite catalyst according to claim 1, wherein the platinum group metal is selected from the group consisting of ruthenium, rhodium, palladium, osmium, iridium, platinum, and combinations thereof.

4. A component in an exhaust system in an engine comprising the composite catalyst of claim 1.

5. An emission control system comprising the composite catalyst of claim 1.

6. A motor vehicle comprising the composite catalyst of claim 1.

* * * * *